(12) United States Patent
Roeder

(10) Patent No.: US 6,816,583 B2
(45) Date of Patent: Nov. 9, 2004

(54) SYSTEM AND METHOD FOR CALL TRANSFERRING IN A COMMUNICATION SYSTEM

(75) Inventor: G. R. Konrad Roeder, Colorado Springs, CO (US)

(73) Assignee: Siemens Aktiengesellschaft, Munich (DE)

( * ) Notice: Subject to any disclaimer, the term of this patent is extended or adjusted under 35 U.S.C. 154(b) by 609 days.

(21) Appl. No.: 09/781,926

(22) Filed: Feb. 12, 2001

(65) Prior Publication Data

US 2002/0111156 A1 Aug. 15, 2002

(51) Int. Cl.⁷ ................................................ H04M 3/58
(52) U.S. Cl. .................. 379/212.01; 370/352; 370/401; 455/416; 455/417; 455/458
(58) Field of Search ............................. 455/417, 432.1, 455/416, 567, 458; 370/328, 329, 349, 352–356, 401; 379/212.01

(56) References Cited

U.S. PATENT DOCUMENTS

| | | | |
|---|---|---|---|
| 4,680,786 A | 7/1987 | Baker et al. .................. | 379/60 |
| 4,829,554 A | 5/1989 | Barnes et al. ................. | 379/58 |
| 4,980,907 A | 12/1990 | Raith et al. ................... | 379/63 |
| 5,353,331 A | 10/1994 | Emery et al. ................. | 379/58 |
| 5,440,613 A | 8/1995 | Fuentes ....................... | 379/60 |
| 5,463,623 A | 10/1995 | Grimes et al. ................ | 370/79 |
| 5,475,681 A | 12/1995 | White et al. .................. | 370/60 |
| 5,506,887 A | 4/1996 | Emery et al. ................. | 379/58 |
| 5,579,384 A | 11/1996 | Seymour ..................... | 379/243 |
| 5,602,843 A | 2/1997 | Gray .......................... | 370/338 |
| 5,610,974 A | 3/1997 | Lantto ........................ | 379/59 |
| 5,629,974 A | 5/1997 | Rajala et al. ................. | 379/58 |

(List continued on next page.)

FOREIGN PATENT DOCUMENTS

| | | |
|---|---|---|
| EP | 1 014 665 A2 | 6/2000 |
| WO | WO 99/05590 | 2/1999 |
| WO | WO 00/33590 | 6/2000 |

OTHER PUBLICATIONS

Call Transfer Supplementary Service for H.323 ITU–T Recommendation H.450–2, Feb. 1998, pp. 1–51.

(List continued on next page.)

*Primary Examiner*—Fan Tsang
*Assistant Examiner*—S Elahee

(57) ABSTRACT

In one aspect of the invention, a method for call transferring in a communication system includes establishing a first call connection between a mobile station and a first telephonic device. The mobile station is operable to communicate with a first client, and the first telephonic device is operable to communicate with a second client. The first client is operable to communicate with the second client. The method also includes placing the first telephonic device on hold, and establishing an alerting call connection between the mobile station and a second telephonic device. The second telephonic device is operable to communicate with a third client, and the third client is operable to communicate with the first and second clients. The method further includes instructing the first client to produce ring back tone for the mobile station, and transferring the first telephonic device to the second telephonic device.

36 Claims, 7 Drawing Sheets

U.S. PATENT DOCUMENTS

| | | |
|---|---|---|
| 5,636,218 A | 6/1997 | Ishikawa et al. ............ 370/401 |
| 5,664,005 A | 9/1997 | Emery et al. ................ 455/422 |
| 5,734,699 A | 3/1998 | Lu et al. ......................... 379/58 |
| 5,740,374 A | 4/1998 | Raffali-Schreinemachers .... 395/200.68 |
| 5,742,596 A | 4/1998 | Baratz et al. ................ 370/356 |
| 5,742,905 A | 4/1998 | Pepe et al. ................... 455/461 |
| 5,754,539 A | 5/1998 | Metz et al. .................. 370/349 |
| 5,764,955 A | 6/1998 | Doolan ........................ 395/500 |
| 5,771,275 A | 6/1998 | Brunner et al. ............... 379/67 |
| 5,781,547 A | 7/1998 | Wilson ........................ 370/395 |
| 5,799,153 A | 8/1998 | Blau et al. ............. 395/200.53 |
| 5,809,028 A | 9/1998 | Nethercott et al. .......... 370/467 |
| 5,818,824 A | 10/1998 | Lu et al. ...................... 370/328 |
| 5,822,569 A | 10/1998 | McPartlan et al. .......... 395/500 |
| 5,862,481 A | 1/1999 | Kulkarni et al. ............. 455/432 |
| 5,873,033 A | 2/1999 | Hjern et al. .................. 455/417 |
| 5,878,347 A | 3/1999 | Joensuu et al. .............. 455/433 |
| 5,887,256 A | 3/1999 | Lu et al. ...................... 455/426 |
| 5,890,064 A | 3/1999 | Widergen et al. ........... 455/445 |
| 5,898,931 A | 4/1999 | I'Anson et al. .............. 455/560 |
| 5,901,352 A | 5/1999 | St-Pierre et al. ............. 455/426 |
| 5,901,359 A | 5/1999 | Malmstrom ................. 455/461 |
| 5,913,166 A | 6/1999 | Buttitta et al. ............... 455/436 |
| 5,924,030 A | 7/1999 | Rautiola et al. ............. 455/426 |
| 5,949,775 A | 9/1999 | Rautiola et al. ............. 370/338 |
| 5,953,322 A | 9/1999 | Kimball ....................... 370/328 |
| 5,953,651 A | 9/1999 | Lu et al. ...................... 455/408 |
| 5,956,331 A | 9/1999 | Rautiola et al. ............. 370/338 |
| 5,960,004 A | 9/1999 | Ramström et al. ........... 370/469 |
| 5,960,344 A | 9/1999 | Mahany ....................... 455/432 |
| 5,978,672 A | 11/1999 | Hartmaier et al. ........... 455/413 |
| 5,995,839 A | 11/1999 | Coursey et al. .............. 455/445 |
| 5,999,813 A | 12/1999 | Lu et al. ...................... 455/435 |
| H1836 H | 2/2000 | Fletcher et al. .............. 455/433 |
| H1837 H | 2/2000 | Fletcher et al. .............. 455/433 |
| 6,026,086 A | 2/2000 | Lancelot et al. ............. 370/353 |
| 6,097,817 A | 8/2000 | Bilgic et al. ................. 380/270 |
| 6,505,050 B1 * | 1/2003 | Brudos et al. ............... 455/458 |
| 6,574,469 B1 * | 6/2003 | Xiang et al. ................. 455/416 |
| 6,674,746 B1 * | 1/2004 | Lamarque, III ............. 370/352 |

OTHER PUBLICATIONS

Korpi, et al., "Supplementary Services in the H.323 IP Telephony Network" IEEE Communications Magazine, IEEE Service Center, Jul. 1999, pp. 118–125.

ITU: Call Hold Supplementary Service for H.323' ITU–T Recommendation H.450–4, Online! May 1999, XP002226855.

ITU: "Packet–Based Multimedia Communications Systems" ITU–T Recommendation H.323, Online! Nov. 2000, XP002226856.

Liao, et al., "Volp Mobility in IP/Cellular Network Internetworking" IEEE Communications Magazine, Apr. 4, 2000, pp. 70–75.

"A 'Plug and Play' Wireless Architecture Supporting Packet Data and IP Voice/Multimedia Services," patent application No. 09/128,553, Inventors: Patrick Apfel, et al., Aug. 3, 1998.

"Method and System for Interworking Voice Bearer Messages Between Circuit–Switched and Packet–Switched Networks," patent application No. 09/499,921, Inventors: James Lyon, et al., Feb. 8, 2000.

ITU–T Recommendation H.323, Dec. 5, 1997.
ITU–T Recommendation H.225.0, Nov. 16, 2000.
ITU–T Recommendation H.450.2, Sep. 24, 1997.
ITU–T Recommendation H.245, Nov. 2000.
GSM 04.91 version 6.0.0, 1997.

* cited by examiner

SYSTEM AND METHOD FOR CALL TRANSFERRING IN A COMMUNICATION SYSTEM

TECHNICAL FIELD OF THE INVENTION

This invention relates generally to the field of communication systems, and more particularly to a system and method for call transferring in a communication system.

BACKGROUND OF THE INVENTION

Call transferring is a supplementary feature often supported in communication systems. Call transferring typically allows one subscriber engaging in a telephone call to transfer the other subscriber to a third party. As a particular example, a first subscriber may be talking to a second subscriber. To initiate a call transfer to a third subscriber, the first subscriber puts the second subscriber on hold and calls the third subscriber. In a "consultation" call transfer, the third subscriber answers the call from the first subscriber, and then the first subscriber transfers the second subscriber to the third subscriber. This may allow, for example, the first subscriber to inform the third subscriber that a call is being transferred. In contrast, during a "blind" call transfer, the first subscriber calls the third subscriber and then performs the transfer, without waiting for the third subscriber to answer. The third subscriber is "alerting," or the third subscriber's telephone is still ringing, when the first subscriber transfers the call.

Call transferring also typically involves or affects one or more state machines in the communication system. Devices in the system may be associated with a state machine, which describes the state of the associated device. The device may change from one state to another as calls are initiated, received, and terminated. A typical state machine may have, for example, four states. An idle state indicates that the device is not in use but is ready to be used, and a holding state indicates that the device is on hold. An alerting state indicates that the device is being notified of an incoming call or has placed a call, and a connected state indicates that an active call exists involving the device.

Problems may be encountered in performing call transfers when mobile stations, such as wireless telephones, and other types of telephones communicate with one another through packet clients, such as Voice over Internet Protocol (VoIP) clients. One problem involves the production of "ring back tone," or the ringing noise that a calling subscriber hears when the subscriber initiates a call. Mobile stations and other telephones typically do not produce ring back tone themselves, relying instead on a central office or equipment at the other end of a phone call to produce the tone. The ring back tone is then communicated back through the system to the mobile station or other telephone. In contrast, packet clients typically generate their own ring back tones, but only when they are in the alerting state. This difference in operation may create problems during a call transfer. For example, a subscriber using a mobile station or other telephone may need to hear ring back tone so the subscriber knows another subscriber's telephone is ringing. However, the subscriber's telephone is unable to produce the tone itself, and the packet client serving the subscriber may be in a connected state, which prevents the client from producing the ring back tone.

To provide the ring back tone to the mobile station or other telephone, conventional systems may attempt to establish a connection in the system between subscribers. This would allow ring back tone to be generated at the called subscriber's end of the phone call and communicated over the connection to the calling subscriber's telephone. A problem with this approach is that the subscribers may be billed for this connection. System operators typically bill subscribers after a connection is established in the system. Because this approach establishes a connection between the subscribers, the subscribers will be billed even if the called subscriber never answers the telephone. As a result, this approach increases the expense to one or both subscribers.

Another problem with this approach is that it may produce state violations in the state machine of one or more devices in the system. For example, a conventional system may establish a connection between subscribers so that ring back tone can be provided to the calling subscriber. This may cause the called subscriber's telephone or packet client to enter the connected state, even though the called subscriber may not have answered the telephone yet. If the called subscriber then answers the telephone, a state violation results. The called subscriber's telephone or packet client would ordinarily enter the connected state after the subscriber answers the phone, but in this case it is already in the connected state. The state violations could have unexpected consequences to billing and other functions in the system.

In addition, conventional call transferring systems may rely on slower mechanisms to perform the call transfers. For example, the International Telecommunications Union-Telecommunications (ITU-T) H.450 call transfer mechanism uses H.245 signaling messages to perform the call transfers. Using the example given above, H.245 messages may be used to create a connection between the second subscriber and the third subscriber during a consultation call transfer. A problem with this approach is that transferring a call using H.245 messages is typically a slow process. Some systems have faster methods for establishing connections, such as the ITU-T H.323 "Fast Connect" feature, but those systems do not allow the use of H.245 signaling messages. As a result, conventional call transfer mechanisms that rely on H.245 signaling messages cannot take advantage of the increased speed available in some systems.

As a result of any of these or other disadvantages, previous call transferring techniques have been inadequate in many communication systems.

SUMMARY OF THE INVENTION

In accordance with the present invention, a system and method for call transferring in a communication system are provided that substantially eliminate or reduce disadvantages and problems associated with conventional systems. In particular, a communication system allows a mobile station to initiate a call transfer and produces ring back tone for the mobile station or other telephonic device without requiring a connection to be established.

According to one embodiment of the present invention, a system for call transferring in a communication system includes a first client operable to communicate with a mobile station and comprising a ring back tone generator operable to produce a ring back tone. The system also includes a second client operable to communicate with a first telephonic device and with the first client, and a third client operable to communicate with a second telephonic device and with the first and second clients. The system further includes a gatekeeper coupled to the clients and operable to establish a first call connection between the mobile station and the first telephonic device. The gatekeeper is also operable to place the first telephonic device on hold, and establish an alerting call connection between the mobile station and the second telephonic device. The gatekeeper is further operable to instruct the first client to produce ring back tone for the mobile station, and to transfer the first telephonic device to the second telephonic device.

In another embodiment of the invention, a method for call transferring in a communication system includes establishing a first call connection between a mobile station and a first telephonic device. The mobile station is operable to communicate with a first client, and the first telephonic device is operable to communicate with a second client. The first client is operable to communicate with the second client. The method also includes placing the first telephonic device on hold, and establishing an alerting call connection between the mobile station and a second telephonic device. The second telephonic device is operable to communicate with a third client, and the third client is operable to communicate with the first and second clients. The method further includes instructing the first client to produce ring back tone for the mobile station, and transferring the first telephonic device to the second telephonic device.

Numerous technical advantages are provided according to various embodiments of the present invention. Particular embodiments of the invention may exhibit none, some, or all of the following advantages. For example, in one embodiment, a system for call transferring is provided. In particular, the system may allow a mobile station to initiate a call transfer. During the call transfer, the system may generate ring back tone and communicate the ring back tone to the mobile station or another telephonic device participating in the transfer without requiring a connection to be established in the system. As a result, the subscribers may be billed less for using the call transfer feature. Because system operators typically begin billing a subscriber when a connection is formed, the lack of a connection may reduce the amount billed to one or more of the subscribers.

Another advantage of at least some embodiments of the invention is that billing may be further reduced for one or more of the subscribers. For example, in a particular embodiment, the mobile stations and other telephonic devices participating in the call transfer communicate with one another through clients, such as Voice over Internet Protocol (VoIP) clients. In this embodiment, fewer or no datagrams containing bearer information, such as voice traffic, are transported between the clients if a subscriber is on hold or hears ring back tone. Because fewer or no datagrams of information are being transported in the system, this reduction in traffic may further reduce the amount billed to one or more of the subscribers.

A further advantage of at least some embodiments of the invention is that it helps to reduce or eliminate the likelihood that a state violation will occur in one or more components of the system. For example, the system may prevent a subscriber's telephone or packet client from entering the connected state before the subscriber answers an incoming call. Because a state violation is less likely to occur, the system may reduce or eliminate the unexpected consequences that may accompany state violations.

In addition, at least some embodiments of the invention increase the speed at which calls may be transferred. In a particular embodiment, the system may perform consultation or blind call transfers without requiring the use of International Telecommunications Union-Telecommunications (ITU-T) H.245 signaling messages to perform the transfer. Because H.245 messages are not used, faster methods for establishing connections, such as the ITU-T H.323 "Fast Connect" feature, can be used during the call transfer. This helps to increase the speed of the call transfers.

Other technical advantages are readily apparent to one of skill in the art from the attached figures, description, and claims.

BRIEF DESCRIPTION OF THE DRAWINGS

To provide a more complete understanding of the present invention and features and advantages thereof, reference is made to the following description in conjunction with the accompanying drawings, in which.

DETAILED DESCRIPTION OF THE INVENTION

Figure 1:
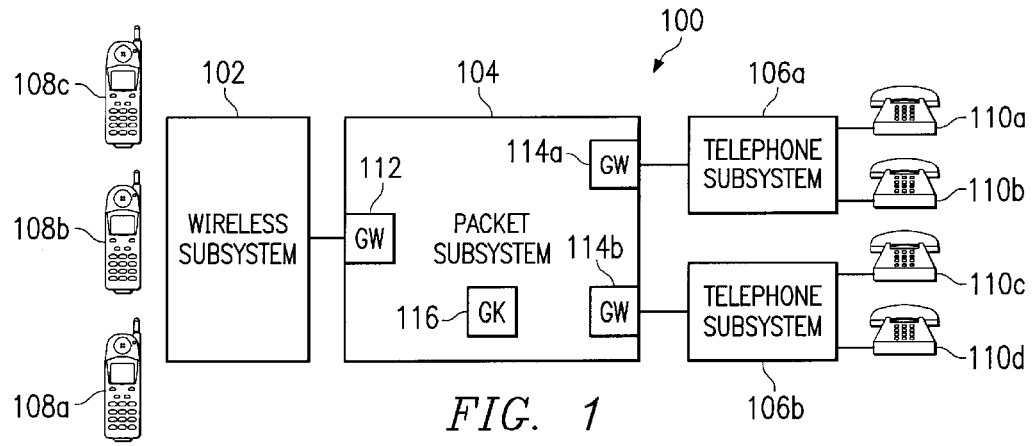
FIG. 1 is a block diagram illustrating an exemplary system for call transferring.

FIG. 1 is a block diagram illustrating an exemplary system 100 for call transferring. In the illustrated embodiment, system 100 includes a wireless subsystem 102, a packet subsystem 104, and one or more telephone subsystems 106. Other embodiments of system 100 may be used without departing from the scope of the present invention.

In one aspect of operation, one or more mobile stations 108 communicate with wireless subsystem 102, and one or more telephones 110 communicate with telephone subsystem 106. System 100 facilitates call transferring between different telephonic devices in system 100. In this document, the term "transfer" refers to an operation in which an existing call between a first subscriber and a second subscriber is transformed into a new established or alerting call between the second subscriber and a third subscriber. As an example, mobile station 108a may transfer a first telephone 110a to a second telephone 110d, so that first telephone 110a and second telephone 110d may communicate. Although system 100 may be described using particular examples, system 100 may facilitate call transfers initiated by a mobile station 108 between any telephonic devices in system 100. Mobile station 108 may, for example, initiate a call transfer involving two telephones 110, a telephone 110 and a mobile station 108, or two mobile stations 108.

Using the example given above, a first subscriber using mobile station 108a may be participating in an existing call with a second subscriber using telephone 110a. The first subscriber may initiate a call transfer to transfer the second subscriber to a third subscriber using telephone 110d. In one embodiment, the first subscriber places the second subscriber on hold and calls the third subscriber. In a particular embodiment, the first subscriber performs a consultation call transfer and waits for the third subscriber to answer telephone 110d before transferring the second subscriber. In another embodiment, the first subscriber performs a blind call transfer and transfers the second subscriber without waiting for the third subscriber to answer telephone 110d.

During the call transfer, system 100 may generate a ring back tone and communicate the tone to mobile station 108a and/or telephone 110a. For example, when the first subscriber using mobile station 108a calls the third subscriber, the system may generate ring back tone and communicate the tone to mobile station 108a, letting the first subscriber know that the third subscriber's telephone 110d is ringing. Also, during a blind call transfer, the system may generate ring back tone and communicate the tone to the second subscriber's telephone 110a, letting the second subscriber know that the third subscriber's telephone 110d is ringing. System 100 may generate and communicate the ring back tone without forming a connection between the first subscriber's mobile station 108, the second subscriber's telephone 110a, and/or the third subscriber's telephone 110d. As a result, the subscribers may be billed less for using the call transfer feature, and this helps to reduce or eliminate state violations in system 100. Also, in one embodiment, when mobile station 108a places telephone 110a on hold, fewer or no datagrams containing information from telephone 110a may flow from telephone subsystem 106a to wireless subsystem 102. This may further reduce the amount billed to one or more of the subscribers.

Wireless subsystem 102 is coupled to packet subsystem 104. In this document, the term "couple" refers to any direct or indirect communication between two or more elements, whether or not those elements are in physical contact with one another. Wireless subsystem 102 communicates with mobile stations 108 over a wireless interface. Wireless subsystem 102 also allows mobile station 108 to communicate with telephone subsystem 106 through packet subsystem 104. Wireless subsystem 102 may, for example, receive information from mobile station 108 and communicate the information to packet subsystem 104. Wireless subsystem 102 may also receive information from packet subsystem 104 and communicate the information to mobile station 108. Wireless subsystem 102 may comprise any hardware, software, firmware, or combination thereof operable to communicate with mobile station 108 over a wireless interface. Wireless subsystem 102 may, for example, comprise a Global System for Mobile communication (GSM) system, an Electronic Industry Alliance/Telecommunication Industry Association (EIA/TIA) IS-136 system, or a Code Division Multiple Access (CDMA) system.

Packet subsystem 104 is coupled to wireless subsystem 102 and telephone subsystem 106. Packet subsystem 104 is operable to transfer information between wireless subsystem 102 and telephone subsystem 106. Packet subsystem 104 may, for example, transport datagrams containing information between wireless subsystem 102 and telephone subsystem 106. Packet subsystem 104 may comprise any hardware, software, firmware, or combination thereof operable to transport datagrams between wireless subsystem 102 and telephone subsystem 106. In one embodiment, packet subsystem 104 supports the International Telecommunications Union-Telecommunications (ITU-T) H.323 protocols to transport datagrams between wireless subsystem 102 and telephone subsystem 106.

In the illustrated embodiment, packet subsystem 104 communicates with wireless subsystem 102 using one or more wireless gateways 112 and with telephone subsystem 106 using one or more telephone gateways 114. Gateways 112 and 114 may communicate and exchange datagrams containing "bearer traffic," or voice traffic, over packet subsystem 104. In this document, wireless gateways 112 and/or telephone gateways 114 may be referred to as "packet clients" or "clients." Wireless gateway 112 may receive information from mobile station 108 through wireless subsystem 102, place the information into one or more datagrams, and communicate the datagrams across packet subsystem 104. Wireless gateway 112 may also receive one or more datagrams over packet subsystem 104 from telephone subsystem 106, extract the information contained in the datagrams, and communicate the information to mobile station 108 through wireless subsystem 102. Similarly, telephone gateway 114 may receive information from telephone 110 through telephone subsystem 106, place the information into one or more datagrams, and communicate the datagrams across packet subsystem 104. Telephone gateway 114 may also receive one or more datagrams over packet subsystem 104 from wireless subsystem 102, extract the information contained in the packets, and communicate the information to telephone 110 through telephone subsystem 106. Wireless gateway 112 may comprise any hardware, software, firmware, or combination thereof operable to facilitate communication between wireless subsystem 102 and packet subsystem 104. Telephone gateway 114 may comprise any hardware, software, firmware, or combination thereof operable to facilitate communication between telephone subsystem 106 and packet subsystem 104.

Packet subsystem 104 may further include a gatekeeper 116 to control the communication between wireless gateways 112 and/or telephone gateways 114. Gatekeeper 116 may also control the transfer of calls in system 100. Gatekeeper 116 may, for example, receive an indication that mobile station 108a wishes to transfer telephone 110a to telephone 110d. Gatekeeper 116 communicates instructions to gateways 112 and/or 114 to determine if the transfer can occur and to transfer the call. Gatekeeper 116 may comprise any hardware, software, firmware, or combination thereof operable to facilitate call transferring in system 100.

Telephone subsystem 106 is coupled to packet subsystem 104 and to one or more telephones 110. Telephone subsystem 106 facilitates communication with telephones 110. Telephone subsystem 106 may, for example, establish a telephone call between a first telephone 110a and a second telephone 110b. Telephone subsystem 106 may also facilitate communication between a telephone 110 and a mobile station 108 by communicating with packet subsystem 104. Telephone subsystem 106 may comprise any suitable hardware, software, firmware, or combination thereof operable to facilitate communication between telephone 110 and mobile station 108. Telephone subsystem 106 may, for example, comprise a private branch exchange (PBX), a Key System, a central office switch, a wireless telephone switch, or any other suitable circuit-switched and/or packet-switched system.

Mobile station 108 communicates with wireless subsystem 102 over a wireless interface. Mobile station 108 may comprise any suitable wireless device operable to communicate with and roam within wireless subsystem 102.

Mobile station 108 may, for example, comprise a mobile telephone or a computer coupled to a wireless modem or radio unit. In one embodiment, mobile station 108 comprises a dual mode mobile station operable to communicate with wireless subsystem 102 using a first protocol and with a public network using a second protocol. In a particular embodiment, mobile station 108 comprises a dual mode GSM/IS-136 mobile handset. Other embodiments of mobile station 108 may be used without departing from the scope of the present invention.

Telephone 110 is coupled to telephone subsystem 106. Telephone 110 may comprise any suitable wireline or wireless telephonic device operable to communicate with telephone subsystem 106. In this document, the phrase "telephonic device" refers to any hardware, software, firmware, or combination thereof operable to provide voice phone services. Telephone 110 may, for example, comprise a fixed telephone, a wireless mobile station, a voice over packet telephone, or a computer executing a telephonic application.

In one aspect of operation, a first subscriber using mobile station 108 may wish to transfer a second subscriber in system 100 to a third subscriber. As an example, the second subscriber may be using telephone 110a, and the third subscriber may be using telephone 110d. The first subscriber may invoke a call transfer function to transfer the second subscriber to the third subscriber. The first subscriber places telephone 110a on hold and calls telephone 110d. If the first subscriber uses a consultation call transfer, the third subscriber answers telephone 110d, and the first and third subscribers may communicate before the call transfer occurs. If the first subscriber uses a blind call transfer, the first subscriber transfers the second subscriber without waiting for the third subscriber to answer telephone 110d.

Gatekeeper 116 implements the call transfer function and controls the transfer of the call from telephone 110a to telephone 110d. Gatekeeper 116 may, for example, communicate instructions to gateways 112 and/or 114 to prepare the gateways for the transfer. Gatekeeper 116 may also issue instructions and prepare the gateways 112 and/or 114 to generate a ring back tone for mobile station 108 and/or telephone 110a. By having gateways 112 and/or 114 generate the ring back tone, system 100 may generate and communicate the ring back tone without forming a connection between the first subscriber's mobile station 108, the second subscriber's telephone 110a, and/or the third subscriber's telephone 110d. The subscribers may be billed less for using the call transfer feature, and state violations in system 100 may be avoided to a greater extent. Also, system 100 may be able to use faster connection methods, such as the ITU-T H.323 "Fast Connect" feature, during the call transfer.

Although FIG. 1 illustrates one embodiment of system 100, various changes may be made to system 100 without departing from the scope of the present invention. For example, any suitable number and/or types of telephones 110 may be used with telephone subsystem 106, and any suitable number of mobile stations 108 may communicate with wireless subsystem 102. Also, FIG. 1 illustrates wireless subsystem 102, packet subsystem 104, and telephone subsystem 106 as distinct entities. In another embodiment, one or more of the subsystems may be combined without departing from the scope of the present invention. For example, packet subsystem 104 may be contained within wireless subsystem 102. Further, functions described as residing within one element of system 100 may be implemented in other elements of system 100. In addition, the invention may be implemented in system 100 using any logic stored in at least one computer processable medium. The logic may be encoded in hardware, software instructions, and/or firmware instructions stored in any suitable device such as, for example, a random access memory (RAM), a read-only memory (ROM), an application-specific integrated circuit (ASIC), or a field programmable gate array (FPGA). Other changes may be made without departing from the scope of the present invention.

Figure 2:
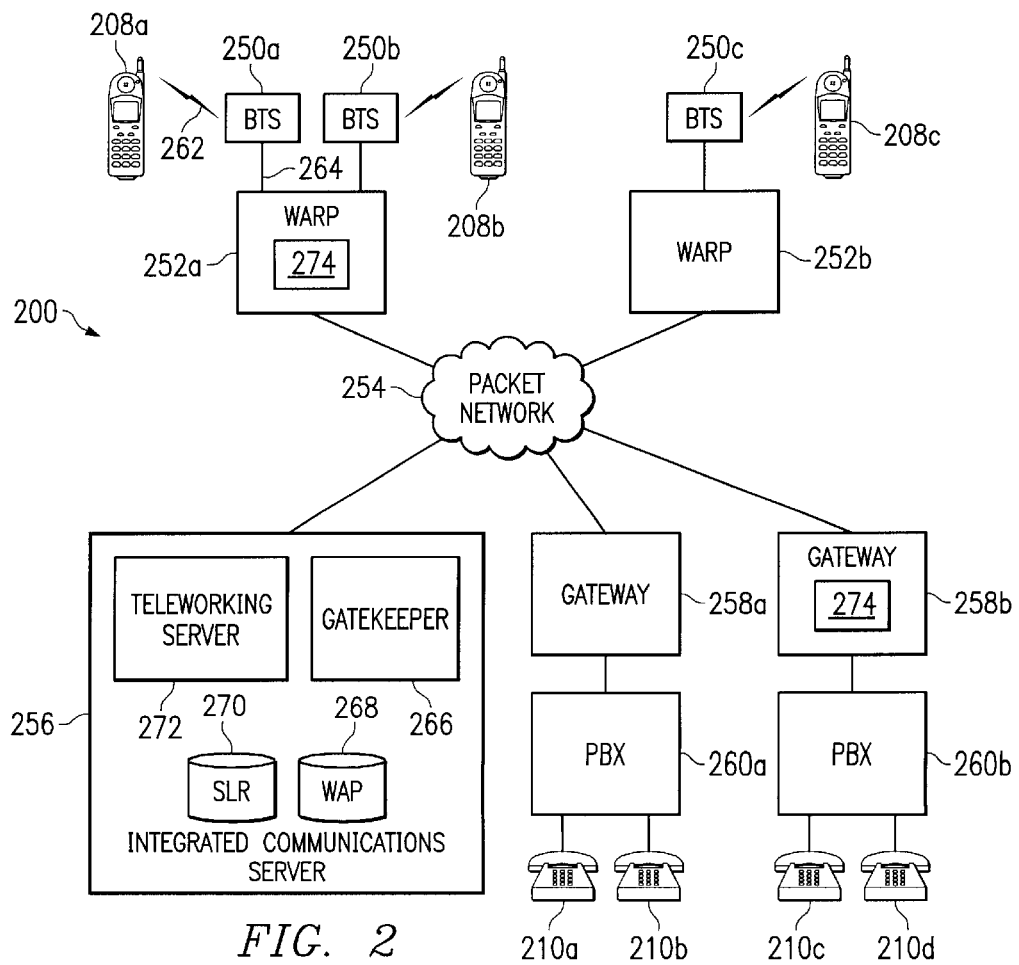
FIG. 2 is a block diagram illustrating another exemplary system for call transferring.

FIG. 2 is a block diagram illustrating another exemplary system 200 for call transferring. In the illustrated embodiment, system 200 includes one or more base stations (BTS) 250, one or more Wireless Adjunct Internet Platforms (WARP) 252, a packet network 254, an integrated communications server 256, one or more gateways 258, and one or more PBXs 260. Other embodiments of system 200 may be used without departing from the scope of the present invention.

Base station 250 is coupled to WARP 252. Base station 250 provides bi-directional communication with mobile stations 208 in a specified geographic area over a wireless interface 262. Base station 250 also transfers information between mobile station 208 and WARP 252. Base station 250 may comprise any hardware, software, firmware, or combination thereof operable to communicate with mobile stations 208 over a wireless interface. Base station 250 may, for example, comprise one or more transceivers operable to exchange circuit-switched and/or packet-switched information with mobile station 208.

Wireless interface 262 facilitates communication between mobile station 208 and base station 250. Wireless interface 262 may comprise any wireless interface operable to transfer circuit-switched and/or packet-switched information between mobile station 208 and base station 250. Interface 262 may, for example, comprise a GSM General Packet Radio Service (GSM/GPRS) interface or a GSM Enhanced Data rates for GSM Evolution (GSM/EDGE) interface.

WARP 252 is coupled to base station 250 by an interface 264 and to packet network 254. WARP 252 facilitates communication between mobile stations 208 and PBX 260 by transporting voice and/or data information between base station 250 and packet network 254. In one embodiment, WARP 252 communicates with mobile station 208 through base station 250 using a circuit-switched protocol, and WARP 252 communicates with packet network 254 using a packet-switched protocol. In this embodiment, WARP 252 also performs an interworking function to translate between the circuit-switched and packet-switched protocols. For example, WARP 252 may convert between the GSM 04.08 and 08.60 protocols used by mobile station 208 and the ITU-T H.323 protocols used by integrated communications server 256 and gateway 258. In addition, WARP 252 packetizes information from mobile station 208 into datagrams for transmission over packet network 254, and WARP 252 depacketizes information contained in datagrams received over packet network 254. WARP 252 may comprise any hardware, software, firmware, or combination thereof operable to facilitate communication between base station 250 and packet network 254. In the illustrated embodiment, WARP 252 includes a ring back tone generator 274. Ring back tone generator 274 is operable to produce a ring back tone, which can be communicated to mobile station 208 through base station 250. Ring back tone generator 274 may comprise any hardware, software, firmware, or combination thereof operable to produce ring back tone.

Interface 264 is coupled to base station 250 and WARP 252. Interface 264 may comprise any suitable interface operable to transfer circuit-switched and/or packet-switched information between base station 250 and WARP 252. Interface 264 may, for example, comprise a GSM Abis wireline interface.

Packet network 254 is coupled to WARP 252, integrated communications server 256, and gateway 258. Packet network 254 transports datagrams from one network address in packet network 254 to another network address. In addition, packet network 254 may be coupled to and communicate with external data or voice networks, such as the Internet or a public land mobile network. Packet network 254 may comprise any suitable packet-switched network. Packet network 254 may, for example, comprise a Local Area Network (LAN), a Wide Area Network (WAN), a Metropolitan Area Network (MAN), a portion of a global computer network such as the Internet, or any other communications system or systems at one or more locations.

In the illustrated embodiment, integrated communications server 256 includes a gatekeeper 266, a Wireless Application Protocol (WAP) server 268, a subscriber location register (SLR) 270, and a teleworking server 272. Although FIG. 2 illustrates integrated communications server 256 as comprising all four of these components, any or all of these components may be implemented on a separate platform or platforms without departing from the scope of the present invention.

Gatekeeper 266 provides call control services for mobile stations 208, WARPs 252, and gateway 258. For example, gatekeeper 266 tracks the location of mobile stations 208, and gatekeeper 266 routes calls for a mobile station 208 to and from the WARP 252 currently serving that mobile station 208. This allows subscribers using mobile stations 208 to roam between geographic areas covered by different base stations 250. Gatekeeper 266 also performs address translation to convert the phone number associated with mobile station 208 to a network address of WARP 252 serving that mobile station 208. In addition, gatekeeper 266 performs call transfer functions in system 200. Gatekeeper 266 may place a first call between two subscribers, such as between mobile station 208a and telephone 210a, on hold. Gatekeeper 266 may place a call on hold, for example, by issuing instructions to a gateway 258 to place a call on hold, or otherwise taking steps to place a call on hold. Gatekeeper 266 may also receive an indication that mobile station 208a wishes to transfer telephone 210a to telephone 210d. Gatekeeper 266 communicates instructions to WARP 252a, gateway 258a, and/or gateway 258b to determine if the transfer can occur and to transfer the call. Gatekeeper 266 may comprise any hardware, software, firmware, or combination thereof operable to facilitate call transferring in system 200.

WARP server 268 stores subscriber information used to allow mobile stations 208 to execute data-based applications and receive data-based services. WAP server 268 may, for example, allow mobile stations 208 to send and receive e-mail, access an enterprise's intranet such as packet network 254, or access the Internet. WAP server 268 may comprise any suitable hardware, software, firmware, or combination thereof operable to provide WAP functionality to mobile stations 208.

Subscriber location register 270 stores subscriber management information for mobile stations 208. For example, subscriber location register 270 may store general subscriber management information downloaded from a public network when mobile station 208 roams into system 200. Subscriber location register 270 also stores each subscriber's extension number, direct dial number, and any other information that is specific to system 200. Subscriber location register 270 may comprise any hardware, software, firmware, or combination thereof operable to store subscriber management information. Subscriber location register 270 may, for example, comprise a SUN workstation with a database.

Teleworking server 272 supports teleworking services in system 200. Teleworking server 272 may, for example, allow a user of system 200 to access information and/or communication capabilities of system 200 from remote locations. The user of telephone 210 may access teleworking server 272 and inform teleworking server 272 of the user's current location. Teleworking server 272 may allow the user to use a remote telephone and to receive the same features as if the user was using telephone 210, even if the remote telephone is outside of system 200. Teleworking server 272 may comprise any hardware, software, firmware, or combination thereof operable to provide teleworking services in system 200.

Gateway 258 is coupled to packet network 254 and PBX 260. Gateway 258 may also be coupled to a public network, such as a public switched telephone network. Gateway 258 transfers information between packet network 254 and PBX 260. In one embodiment, gateway 258 communicates with packet network 254 using a packet-switched protocol and with PBX 260 using a circuit-switched protocol. In this embodiment, gateway 258 also performs an interworking function to translate between the packet-switched and circuit-switched protocols. In a particular embodiment, gateway 258 converts between the ITU-T H.323 protocols used by WARP 252 and integrated communications server 256 and the circuit-switched protocols used by PBX 260. In addition, gateway 258 packetizes information into datagrams for transmission over packet network 254, and gateway 258 depacketizes information contained in datagrams received over packet network 254. Gateway 258 may communicate bearer and signaling information to PBX 260 over interface 214. Gateway 258 may comprise any hardware, software, firmware, or combination thereof operable to facilitate communication between packet network 254 and PBX 260. In the illustrated embodiment, gateway 258 includes a ring back tone generator 274. Ring back tone generator 274 is operable to produce a ring back tone, which can be communicated to telephone 210 through PBX 260.

PBX 260 is coupled to gateway 258 and to one or more telephones 210. PBX 260 may also be coupled to one or more public networks, such as a public land mobile network and a public switched telephone network. PBX 260 transfers information between telephones 210 and/or between gateway 258 and telephones 210. PBX 260 may comprise any suitable circuit-switched and/or packet-switched network operable to facilitate communication between telephone 210 and gateway 258.

In one aspect of operation, a first subscriber using mobile station 208 may wish to transfer a second subscriber in system 200 to a third subscriber. As an example, the second subscriber may be using telephone 210a, and the third subscriber may be using mobile station 208c. The first subscriber may invoke a call transfer function to transfer the second subscriber to the third subscriber. The first subscriber places telephone 210a on hold, calls mobile station 208c, and transfers telephone 210a to mobile station 208c. The first subscriber may or may not wait for the third subscriber to answer mobile station 208c.

Gatekeeper 266 controls the transfer of the call from telephone 210a to mobile station 208c. Gatekeeper 266 may, for example, receive a request from WARP 252*a* to transform the existing call between mobile station 208*a* and telephone 210*a* into a call between telephone 210*a* and mobile station 208*c*. Gatekeeper 266 informs gateway 258*a*, which serves telephone 210*a*, and WARP 252*b*, which serves mobile station 208*c*, of the transfer. Gatekeeper 266 instructs WARP 252*a* to generate ring back tones for mobile station 208*a*, allowing the first subscriber to "hear" the third subscriber's mobile station 208*c* ringing. During a blind call transfer, gatekeeper 266 also instructs gateway 258*a* to generate ring back tone for telephone 210*a*, allowing the second subscriber to "hear" the third subscriber's mobile station 208*c* ringing. By having WARP 252*a* and/or gateway 258*a* generate the ring back tones, a connection in system 200 need not be established to carry the ring back tone to mobile station 208*a* or telephone 210*a*.

In this example, gateway 258*a* generates ring back tone for telephone 210*a*. In another example, WARP 252 could generate ring back tone for a mobile station 208. For example, if mobile station 208*a* were transferring mobile station 208*c* to telephone 210*a*, WARP 252*b* could produce ring back tone for mobile station 208*c*. This allows the subscriber using mobile station 208*c* to hear ring back tone when telephone 210*a* is alerting.

Although FIG. 2 illustrates one embodiment of system 200, various changes may be made to system 200 without departing from the scope of the present invention. For example, any number of base stations 250 may be coupled to each WARP 252, and any number of WARPs 252 may be coupled to packet network 254. Also, although FIG. 2 illustrates a PBX 260 coupled to gateway 258, other telephone systems may be coupled to gateway 258, such as a Key System, a central office switch, a wireless telephone switch, a packet-based soft switch, or any other suitable circuit-switched and/or packet-switched system. Further, although gatekeeper 266 and gateway 258 are illustrated as separate entities, both may be implemented in an integrated platform. The invention may be implemented in system 200 using any logic stored in at least one computer processable medium. Other changes may be made to system 200 without departing from the scope of the present invention.

Figure 3A:
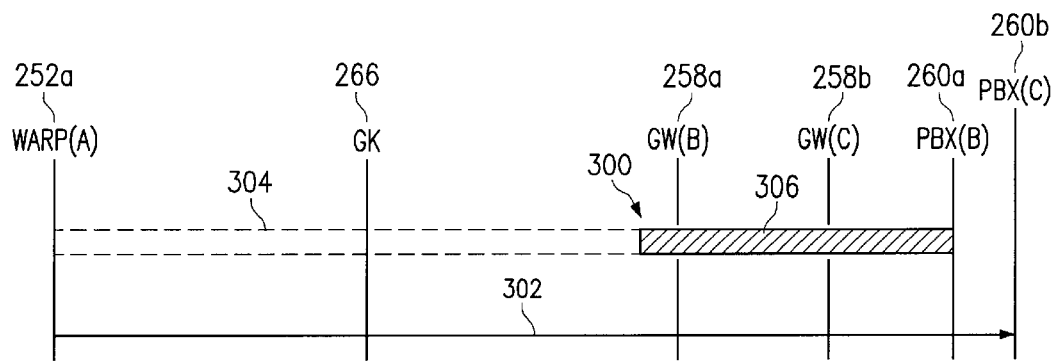
FIGS. 3A–3C are signaling diagrams illustrating exemplary signaling for a blind call transfer.
Figure 3B:
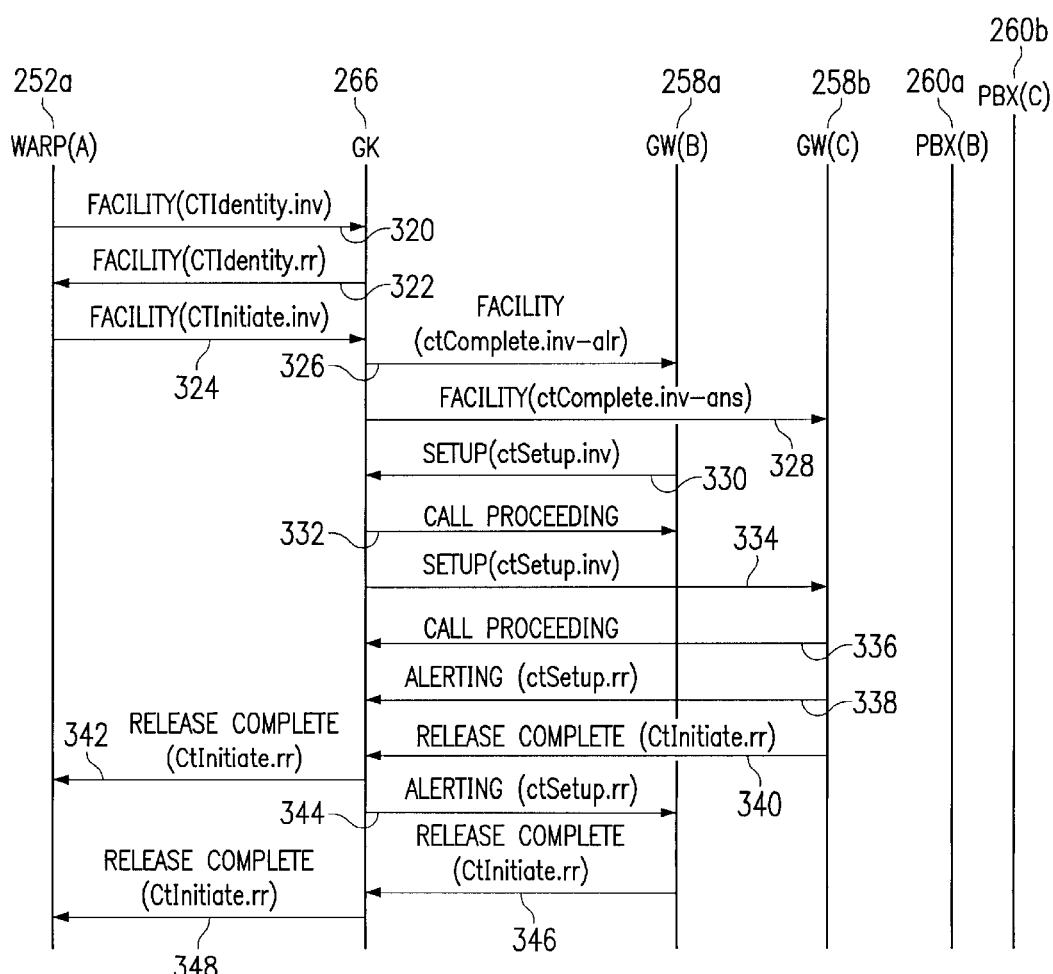
Figure 3C:
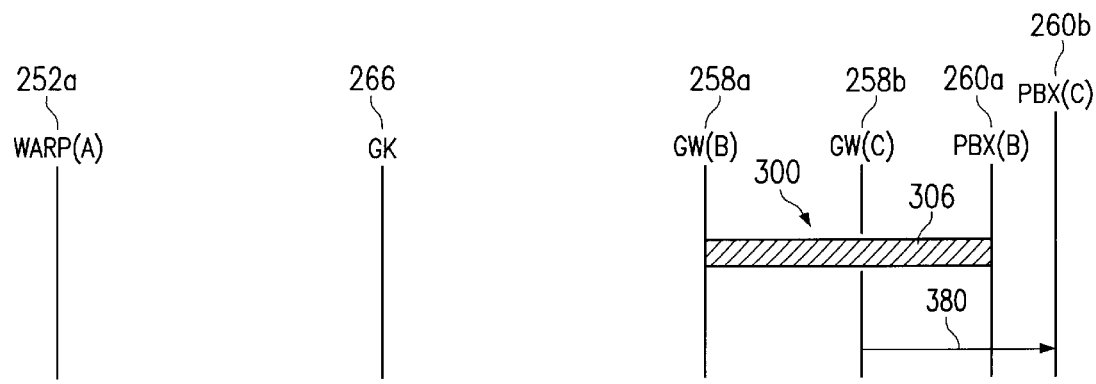

FIGS. 3A–3C are signaling diagrams illustrating exemplary signaling for a blind call transfer. In particular, FIGS. 3A–3C illustrate a blind transfer initiated by a first subscriber using mobile station 208 (called "A"), which transfers a second subscriber using telephone 210*a* (called "B") to a third subscriber using telephone 210*d* (called "C"). Components of system 200 are identified in FIGS. 3A–3C according to the subscriber served by that component. For example, WARP 252*a* is labeled "WARP(A)" because it is serving the first subscriber. Similarly, gateways 258*a* and 258*b* are labeled "GW(B)" and "GW(C)," respectively, because they serve the second and third subscribers, respectively. Although FIGS. 3A–3C are described with respect to system 200 of FIG. 2, the same or similar signaling may be used in system 100 of FIG. 1 or any other suitable communication system.

FIG. 3A illustrates the telephone calls involved in the blind transfer before the transfer mechanism is invoked. Telephone call 300 involves the first subscriber and the second subscriber. Telephone call 300 represents a call for which system 200 has established a voice channel between mobile station 208 and telephone 210*a*. When the first subscriber places the second subscriber on hold, the hold state divides telephone call 300 into two segments 304 and 306. Segment 304 illustrates a segment placed on hold, and segment 306 illustrates a segment that remains active. The voice channel between WARP 252*a* and gateway 258*a* still exists, but a reduced amount of bearer traffic is transported between WARP 252*a* and gateway 258*a*. The voice channel between gateway 258*a* and PBX 260*a* also remains intact.

After placing the second subscriber on hold, the first subscriber places telephone call 302 to the third subscriber. Telephone call 302 represents a call for which system 200 has not established a voice channel between mobile station 208 and telephone 210*d*. Instead, call 302 represents an alerting call that has not been answered by the third subscriber. During call 302, gatekeeper 266 may instruct WARP 252*a* to generate ring back tone for mobile station 208*a*. This allows the first subscriber to hear ring back tone through mobile station 208*a* when the third subscriber's telephone 210*d* is alerting.

FIG. 3B illustrates the signaling messages used to perform the blind call transfer. In the illustrated embodiment, the signaling messages used by WARP 252, gatekeeper 266, and gateways 258 may be defined by the ITU-T H.225 standard. In a particular embodiment, WARP 252, gatekeeper 266, and gateways 258 may communicate without exchanging ITU-T H.245 signaling messages. Other embodiments may be used without departing from the scope of the present invention.

When the first subscriber attempts to transfer telephone 210*a* to telephone 210*d*, WARP 252*a* communicates a Facility message 320, a CTIdentity.inv message, to invoke the call transferring mechanism to gatekeeper 266. This message 320 allows WARP 252*a* to inquire whether telephone 210*d* can participate in the call transfer. If telephone 210*d* can participate, gatekeeper 266 responds with a return result message 322, a CTIdentity.rr message. This message 322 identifies an address for telephone 210*d*, such as the address of gateway 258*b*, and an identifier that identifies call 302.

To initiate the call transfer, WARP 252*a* communicates a CTInitiate.inv message 324 to gatekeeper 266. Gatekeeper 266 then notifies gateways 258*a* and 258*b* of the call transfer. Gatekeeper 266 informs gateway 258*a* that the third subscriber is in an alerting state using message 326, and gatekeeper 266 informs gateway 258*b* that the second subscriber is in an active or connected state using message 328.

After informing gateways 258*a* and 258*b* of the transfer, gatekeeper 266 and gateways 258 prepare a connection between gateway 258*a* and gateway 258*b*. The connection may be established if and when the third subscriber answers telephone 210*d*. Gateway 258*a* requests a connection by communicating a Setup message 330 to gatekeeper 266, and gatekeeper 266 responds with a Call Proceeding message 332. Gatekeeper 266 also requests a connection by communicating a Setup message 334 to gateway 258*b*, which responds with a Call Proceeding message 336. Gateway 258*b* alerts gatekeeper 266 using message 338 that gatekeeper 266 may establish a connection when telephone 210*d* is answered. At this point, a call connection may be established and a voice channel set up between gateway 258*a* and gateway 258*b* if the third subscriber answers telephone 210*d*.

Release complete messages 340 and 342 release the segment of the alerting call 302 between WARP 252*a* and gateway 258*b*. This removes mobile station 208 from further participation with the alerting call 302. Alerting message 344 drives gateway 258*a* into an alerting state, and release complete messages 346 and 348 release segment 304 of call 300 between WARP 252*a* and gateway 258*a*. This removes mobile station 208 from further participation with the existing call 300.

As illustrated in FIG. 3C, the signaling messages 320–348 illustrated in FIG. 3B have successfully performed a blind call transfer. The first segment 304 of telephone call 300 has been released between WARP 252a and gateway 258a. Segment 306 between gateway 258a and PBX 260a remains active, and an active voice channel remains intact between telephone 210a served by PBX 260a and gateway 258a. Mobile station 208 has been removed from participation in call 300. Also, a segment 380 of alerting telephone call 302 remains between gateway 258b and PBX 260b, and the segment between WARP 252a and gateway 258b has been released. This also removes mobile station 208 from further participation in call 302. The second subscriber, using telephone 210a, is waiting for the third subscriber to answer telephone 210d.

To facilitate the production of a ring back tone which can be heard by the second subscriber using telephone 210a, message 344 in FIG. 3B has driven gateway 258a into an alerting state. Gateway 258 produces a ring back tone capable of being heard by the second subscriber through telephone 210a. As a result, the second subscriber can hear the ring back tone when telephone 210d is alerting.

While FIGS. 3A–3C illustrate mobile station 208 initiating a call transfer between two telephones 210, the same or similar signaling messages may be used when mobile station 208 initiates a call transfer involving two mobile stations 208 or a telephone 210 and a mobile station 208. For example, if the second subscriber is using a mobile station 208, gateway 258a could be replaced by a WARP 252 serving the second subscriber, and PBX 260a could be replaced by the second subscriber's mobile station 208. Similarly, if the third subscriber is using a mobile station 208, gateway 258b could be replaced by a WARP 252 serving the third subscriber, and PBX 260b could be replaced by the third subscriber's mobile station 208.

Figure 4:
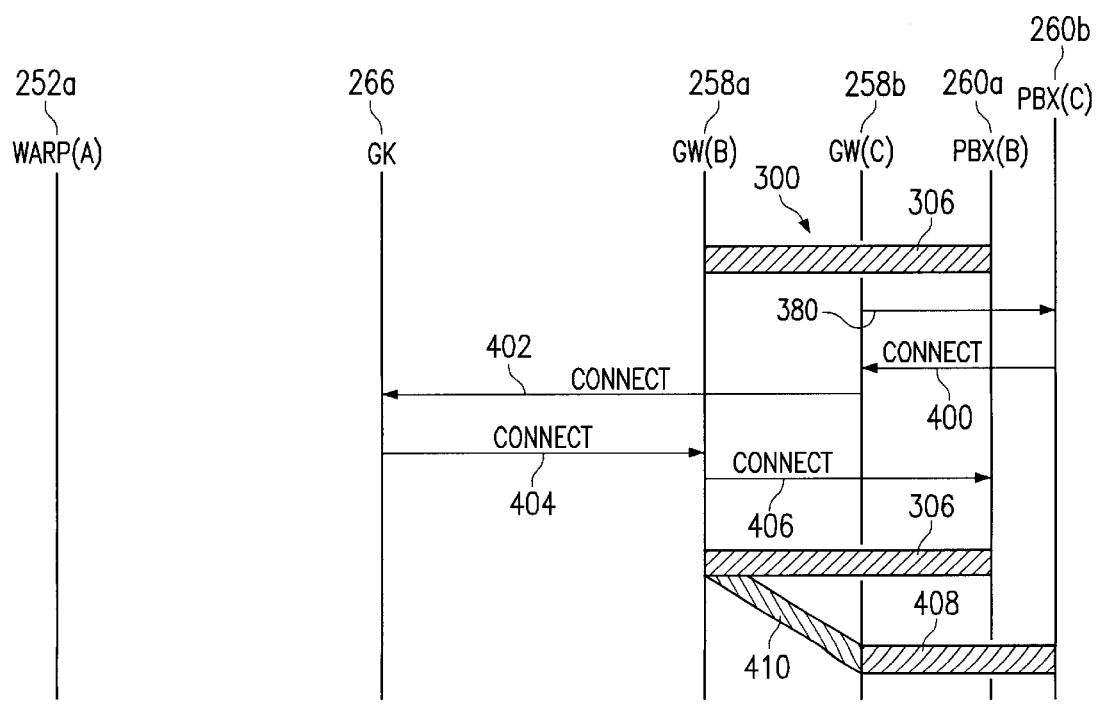
FIG. 4 is a signaling diagram illustrating exemplary signaling when a called subscriber answers a call after a blind call transfer.

FIG. 4 is a signaling diagram illustrating exemplary signaling when a called subscriber answers a call after a blind call transfer. The called subscriber may, for example, represent the third subscriber that was called during the blind call transfer of FIGS. 3A–3C. The signaling in FIG. 4 may occur when the third subscriber answers telephone 210d after the blind transfer. In the illustrated embodiment, the signaling messages communicated between a PBX 260 and a gateway 258 may be defined by the ITU-T Q.931 standard, and communications between gatekeeper 266 and gateways 258 may be defined by the ITU-T H.225 standard. In a particular embodiment, WARP 252, gatekeeper 266, gateways 258, and PBXs 260 may communicate without exchanging ITU-T H.245 signaling messages. Other embodiments may be used without departing from the scope of the present invention.

When the third subscriber answers telephone 210d, PBX 260b sends a connect message 400 to gateway 258b, and gateway 258b informs gatekeeper 266 that the third subscriber answered telephone 210d using a connect message 402. Gatekeeper 266 responds by communicating a connect message 404 to gateway 258a, and gateway 258a sends a connect message 406 to PBX 260a. The connect messages 400–406 cause gatekeeper 266 and gateways 258 to establish a call connection between PBX 260a and PBX 260b through gateway 258a and gateway 258b.

As shown in FIG. 4, segment 306 of call 300 between gateway 258a and PBX 260a remains active. Connect message 400 creates a segment 408 between gateway 258b and PBX 260b, and connect messages 402 and 404 create a channel or bridge 410 between gateway 258a and gateway 258. As a result, an active voice channel exists between telephone 210a and telephone 210d.

Figure 5:
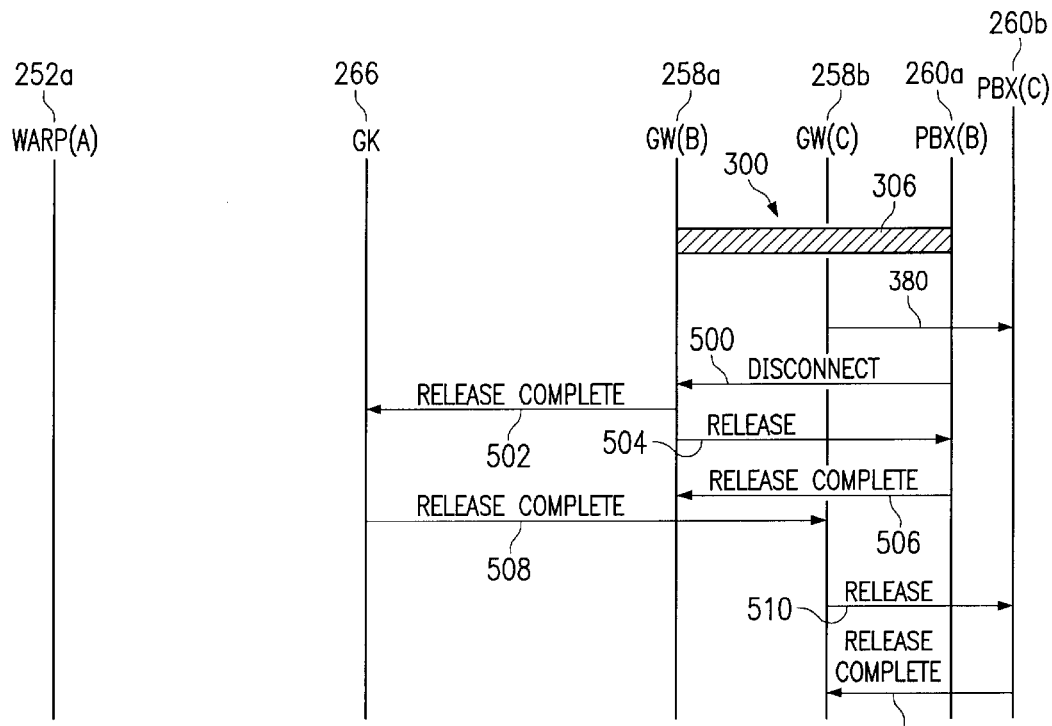
FIG. 5 is a signaling diagram illustrating exemplary signaling when a calling subscriber abandons a call after a blind call transfer.

FIG. 5 is a signaling diagram illustrating exemplary signaling when a calling subscriber abandons a call after a blind call transfer. The calling subscriber may, for example, represent the second subscriber participating in the blind call transfer of FIGS. 3A–3C. The signaling in FIG. 5 may occur when the second subscriber hangs up telephone 210a after the blind transfer, such as when the third subscriber does not answer telephone 210d.

When the second subscriber hangs up telephone 210a, PBX 260a sends a disconnect message 500 to gateway 258a. This informs gateway 258a that the second subscriber has abandoned the call to telephone 210d. Gateway 258a informs gatekeeper 266 that the second subscriber has disconnected and that segment 306 is being released using a release complete message 502. Gateway 258a also instructs PBX 260a to release segment 306 of call 300 using a release message 504. PBX 260a responds with a release complete message 506, and segment 306 of call 300 is released.

Gatekeeper 266 also sends a release complete message 508 to gateway 258b, informing gateway 258b that alerting call segment 380 should be released. Gateway 258b instructs PBX 260b to release segment 380 using a release message 510. PBX 260b responds with a release complete message 512, and segment 380 is dropped. This completes the release of call segments 306 and 380. An active channel no longer exists between telephone 210a and gateway 258a, and an alerting segment 380 no longer exists between gateway 258b and PBX 260b.

Figure 6A:
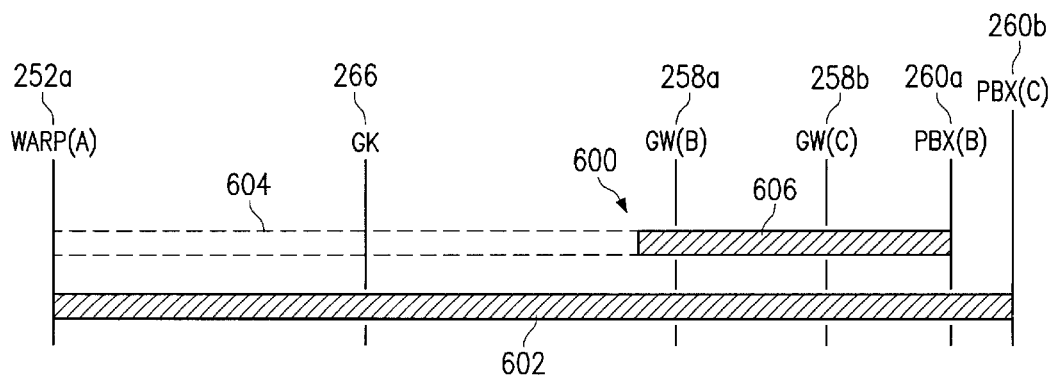
FIGS. 6A–6C are signaling diagrams illustrating exemplary signaling for a consultation call transfer.
Figure 6B:
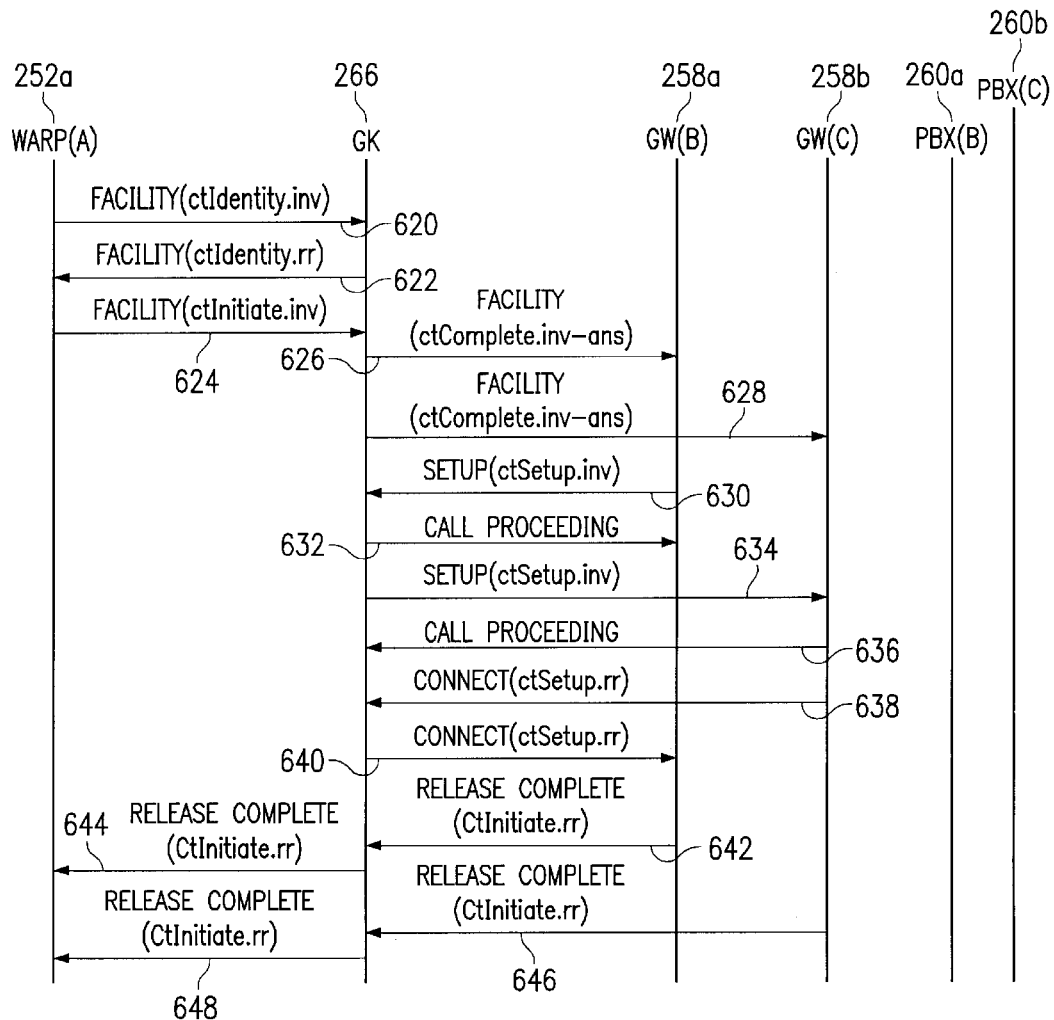
Figure 6C:
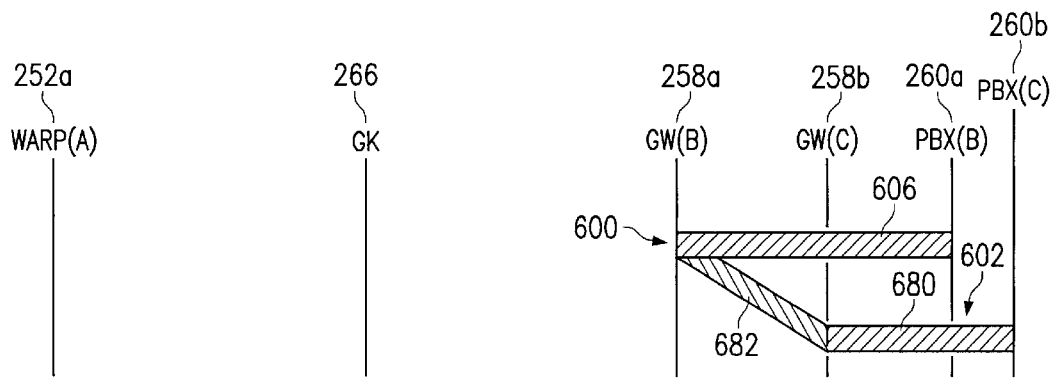

FIGS. 6A–6C are signaling diagrams illustrating exemplary signaling for a consultation call transfer. In particular, FIGS. 6A–6C illustrate a consultation transfer initiated by a first subscriber using mobile station 208 (called "A"), which transfers a second subscriber using telephone 210a (called "B") to a third subscriber using another telephone 210d (called "C"). Although FIGS. 6A–6C are described with respect to system 200 of FIG. 2, the same or similar signaling may be used in system 100 of FIG. 1 or any other suitable communication system.

FIG. 6A illustrates the telephone calls involved in the consultation transfer before the transfer mechanism is invoked. Telephone call 600 involves the first subscriber and the second subscriber. Telephone call 600 represents a call for which system 200 has established a voice channel between mobile station 208 and telephone 210a. When the first subscriber places the second subscriber on hold, the hold state divides telephone call 600 into segments 604 and 606, segment 604 on hold and segment 606 remaining active. The voice channel between WARP 252a and gateway 258a still exists, but the bearer traffic transported between WARP 252a and gateway 258a is reduced. The voice channel between gateway 258a and PBX 260a also remains intact.

After placing the second subscriber on hold, the first subscriber places telephone call 602 to the third subscriber, and the third subscriber answers the call 602. System 200 establishes a voice channel between mobile station 208 and telephone 210d. Before the third subscriber answers telephone 210d, gatekeeper 266 may instruct WARP 252a to generate ring back tone for mobile station 208a. This allows the first subscriber to hear ring back tone through mobile station 208a when the third subscriber's telephone 210d is alerting.

FIG. 6B illustrates the signaling messages used to perform the consultation call transfer. When the first subscriber attempts to transfer telephone 210a to telephone 210d, WARP 252a communicates a message 620 invoking the call transferring function to gatekeeper 266. This message 620 allows WARP 252a to inquire whether telephone 210d can participate in the call transfer. If telephone 210d can participate, gatekeeper 266 responds with a return result message 622, identifying an address for telephone 210d and an identifier for call 602. WARP 252a initiates the call transfer by communicating a CTInitiate.inv message 624 to gatekeeper 266, and gatekeeper 266 notifies gateways 258a and 258b of the call transfer. Gatekeeper 266 informs gateway 258a that the third subscriber is in an active or connected state using message 626, and gatekeeper informs gateway 258b that the second subscriber is in an active or connected state using message 628.

After informing gateways 258a and 258b of the transfer, gatekeeper 266 and gateways 258 set up a connection between gateway 258a and gateway 258b. Gateway 258a requests a connection by communicating a Setup message 630 to gatekeeper 266, and gatekeeper 266 responds with a Call Proceeding message 632. Gatekeeper 266 also requests a connection by communicating a Setup message 634 to gateway 258b, which responds with a Call Proceeding message 636. A voice channel is established between gateway 258a and gateway 258b when gateway 258b sends a connect message 638 to gatekeeper 266 and gatekeeper 266 sends a connect message 640 to gateway 258a.

Release complete messages 642 and 644 release segment 604 of call 600 between WARP 252a and gateway 258a. This removes mobile station 208 from further participation with call 600. Release complete messages 646 and 648 release the segment of call 602 between WARP 252a and gateway 258b. This also removes mobile station 208 from further participation with call 602 and completes the call transfer.

As illustrated in FIG. 6C, the signaling messages 620–648 illustrated in FIG. 6B have successfully performed a consultation call transfer. The first segment 604 of telephone call 600 has been released between WARP 252a and gateway 258a. Segment 606 between gateway 258a and PBX 260a remains active, so an active voice channel remains intact between telephone 210a served by PBX 260a and gateway 258a. Mobile station 208 has been removed from participation in call 600. Also, a segment 680 of call 602 remains active between gateway 258b and PBX 260b, so an active voice channel remains intact between telephone 210d served by PBX 260b and gateway 258b. Mobile station 208 has also been removed from participation in call 602. Further, a bridge or channel 682 has been established between gateways 258a and 258b, completing the voice channel between telephone 210a and telephone 210d. The second subscriber, using telephone 210a, may speak with the third subscriber, using telephone 210d.

While FIGS. 6A–6C illustrate mobile station 208 initiating a call transfer between two telephones 210, the same or similar signaling messages may be used when mobile station 208 initiates a call transfer between two mobile stations 208 or between a telephone 210 and a mobile station 208. For example, if the second subscriber is using a mobile station 208, gateway 258a could be replaced by a WARP 252 serving the second subscriber, and PBX 260a could be replaced by the second subscriber's mobile station 208. Similarly, if the third subscriber is using a mobile station 208, gateway 258b could be replaced by a WARP 252 serving the third subscriber, and PBX 260b could be replaced by the third subscriber's mobile station 208.

Figure 7:
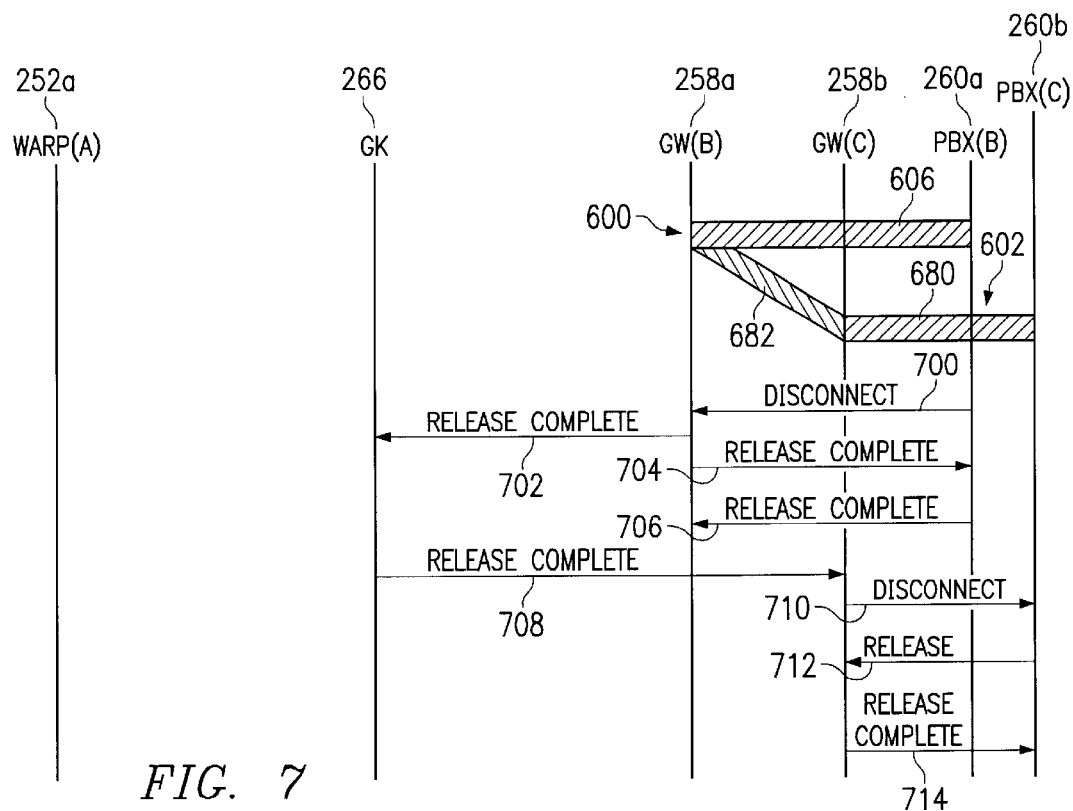
FIG. 7 is a signaling diagram illustrating exemplary signaling when a calling subscriber releases a call after a consultation call transfer.

FIG. 7 is a signaling diagram illustrating exemplary signaling when a calling subscriber releases a call after a consultation call transfer. The calling subscriber may, for example, represent the second subscriber participating in the consultation call transfer of FIGS. 6A–6C. The signaling in FIG. 7 may occur when the second subscriber disconnects or hangs up telephone 210a after the call transfer has been completed.

When the second subscriber hangs up telephone 210a, PBX 260a sends a disconnect message 700 to gateway 258a, informing gateway 258a that the second subscriber has disconnected. Gateway 258a informs gatekeeper 266 that the second subscriber has disconnected and that segment 606 of call 600 is being released using a release complete message 702. Gateway 258a instructs PBX 260a to release segment 606 using a release message 704. PBX 260a responds with a release complete message 706, and segment 606 of call 600 is released.

Gatekeeper 266 also sends a release complete message 708 to gateway 258b, informing gateway 258b that segment 680 should be released. Gateway 258b informs PBX 260b of the disconnect using a disconnect message 710. PBX 260b responds with a release message 712, instructing gateway 258b to release segment 680 of call 602. Gateway 258b responds with a release complete message 714, and segment 680 is released. This completes the release of call segments 606 and 680. An active channel no longer exists between telephone 210a and gateway 258a or between telephone 210d and gateway 258b.

Figure 8:
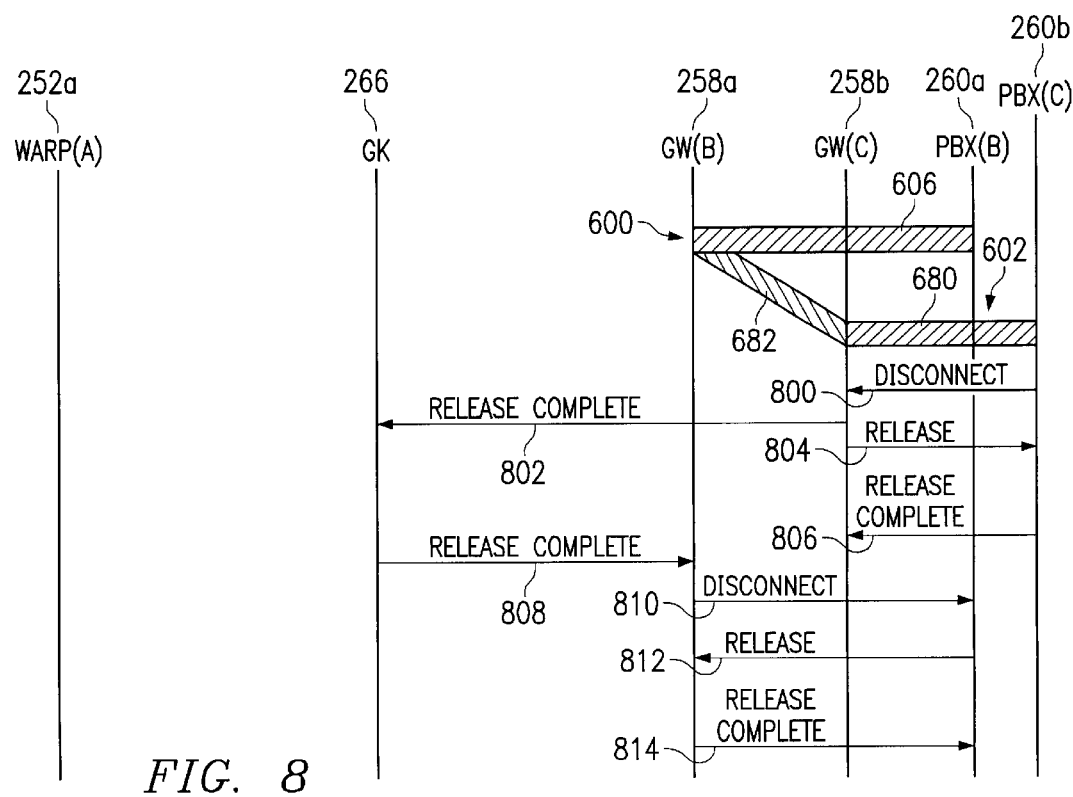
FIG. 8 is a signaling diagram illustrating exemplary signaling when a called subscriber releases a call after a consultation call transfer.

FIG. 8 is a signaling diagram illustrating exemplary signaling when a called subscriber releases a call after a consultation call transfer. The called subscriber may, for example, represent the third subscriber participating in the consultation call transfer of FIGS. 6A–6C. The signaling in FIG. 8 may occur when the third subscriber hangs up telephone 210d after the call transfer has been completed.

As illustrated in FIG. 8, the signaling messages 800–814 are similar to the signaling messages 700–714 of FIG. 7. Because telephone 210a disconnected in FIG. 7 and telephone 210d disconnected in FIG. 8, the same messages can be used to disconnect the call segments 606 and 680 in FIGS. 7 and 8. The different telephone 210 initiating the disconnect reverses which PBX 260 initiates the disconnect message, which also reverses the remainder of the gateways 258 and PBXs 260 initiating the messages.

Figure 9:
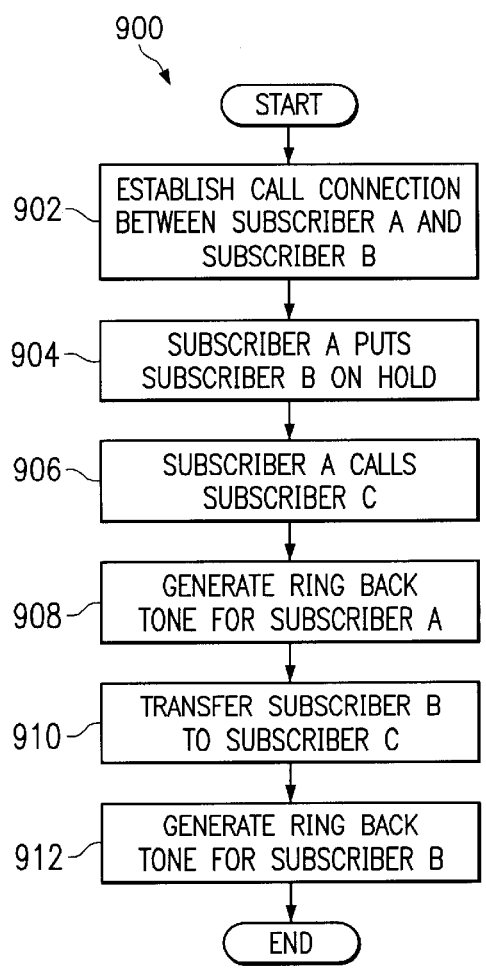
FIG. 9 is a flow diagram illustrating an exemplary method for performing a blind call transfer in a communication system.

FIG. 9 is a flow diagram illustrating an exemplary method 900 for performing a blind call transfer in a communication system. Although method 900 is described with respect to system 100 of FIG. 1, the same or similar method may be used to transfer calls in system 200 of FIG. 2 or any other suitable communication system.

A call connection is established between two subscribers at step 902. This may include, for example, the first subscriber calling the second subscriber, or the second subscriber calling the first subscriber. This may also include the first subscriber using a mobile station 108 and the second subscriber using a mobile station 108 or a telephone 110. The first subscriber places the second subscriber on hold at step 904. This may include, for example, the first subscriber pressing a "Hold" button on mobile station 108 or otherwise invoking the hold feature in wireless subsystem 102. The hold condition may be characterized in that fewer or no datagrams may flow through packet subsystem 104 from the second subscriber while the second subscriber is on hold. The first subscriber calls a third subscriber at step 906. This may include, for example, the first subscriber calling the third subscriber's mobile station 108 or telephone 110. System 100 generates ring back tone for the first subscriber at step 908. This may include, for example, gatekeeper 116 instructing wireless gateway 112, such as a wireless adjunct internet platform, to produce the ring back tone and communicate it to the first subscriber's mobile station 108.

System 100 transfers the second subscriber to the third subscriber at step 910. This may include, for example, the first subscriber invoking the call transfer feature. This may also include system 100 releasing segments of the first subscriber's call to the second subscriber and the first subscriber's call to the third subscriber. At this point, the second subscriber is connected, and the third subscriber's mobile station 108 or telephone 110 is alerting. System 100 generates ring back tone for the second subscriber at step 912. If the second subscriber is using a mobile station 108, this may include the wireless gateway 112 serving mobile station 108 generating the ring back tone. If the second subscriber is using a telephone 110, this may include the telephone gateway 114 serving telephone 110, such as a gateway 258, generating the ring back tone. The wireless gateway 112 or telephone gateway 114 communicates the ring back tone to the second subscriber's mobile station 108 or telephone 110 until the second subscriber abandons the call or the third subscriber answers the call.

Figure 10:
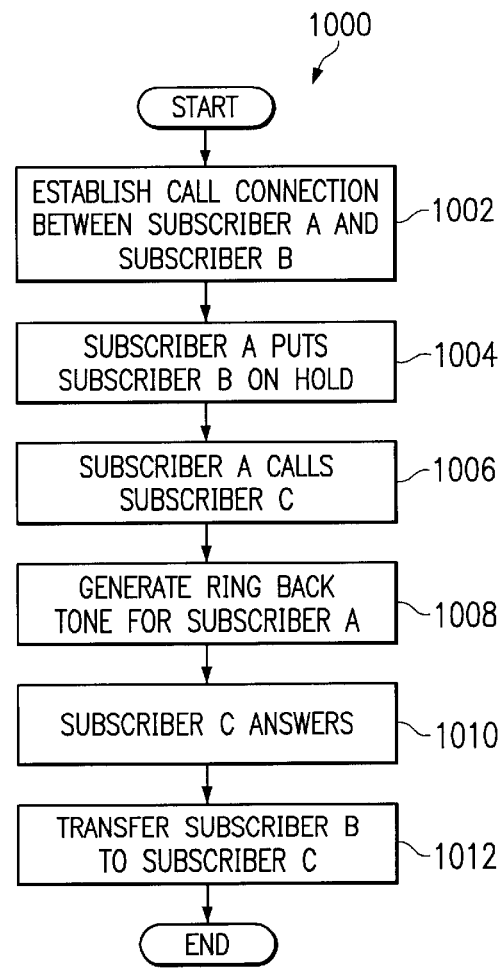
FIG. 10 is a flow diagram illustrating an exemplary method for performing a consultation call transfer in a communication system.

FIG. 10 is a flow diagram illustrating an exemplary method 1000 for performing a consultation call transfer in a communication system. Although method 1000 is described with respect to system 100 of FIG. 1, the same or similar method may be used to transfer calls in system 200 of FIG. 2 or any other suitable communication system.

A call connection is established between two subscribers at step 1002. This may include the first subscriber calling or receiving a call from the second subscriber. This may also include the first subscriber using a mobile station 108 and the second subscriber using a mobile station 108 or a telephone 110. The first subscriber places the second subscriber on hold at step 1004. This may include, for example, the first subscriber pressing a "Hold" button on mobile station 108 or otherwise invoking the hold feature. The first subscriber calls a third subscriber at step 1006. This may include, for example, the first subscriber calling the third subscriber's mobile station 108 or telephone 110. System 100 generates ring back tone for the first subscriber at step 1008. This may include, for example, gatekeeper 116 instructing wireless gateway 112, such as a wireless adjunct internet platform, to produce and communicate the ring back tone to the first subscriber's mobile station 108.

The third subscriber answers the first subscriber's call at step 1010. This may include, for example, the third subscriber answering telephone 110 or mobile station 108, and the wireless gateway 112 or the telephone gateway 114 informing gatekeeper 116 that the call has been answered. During this time, the first and third subscribers may communicate. The first subscriber may inform the third subscriber of the identity of the second subscriber and that a call is being transferred. System 100 transfers the second subscriber to the third subscriber at step 1012. This may include, for example, the first subscriber invoking the transfer feature. This may also include system 100 releasing segments of the first subscriber's call to the second subscriber and the first subscriber's call to the third subscriber. At this point, the second subscriber is connected to the third subscriber.

Although the present invention has been described with several embodiments, a number of changes, substitutions, variations, alterations, and modifications may be suggested to one skilled in the art, and it is intended that the invention encompass all such changes, substitutions, variations, alterations, and modifications that fall within the spirit and scope of the appended claims.

What is claimed is:

1. A method for call transferring in a communication system, comprising:

establishing a first call connection between a mobile station and a first telephonic device, the mobile station operable to communicate with a first client in a packet-switched network, the first telephonic device operable to communicate with a second client in the packet-switched network, the first client operable to communicate with the second client;

placing the first telephonic device on hold;

establishing an alerting call connection between the mobile station and a second telephonic device, the second telephonic device operable to communicate with a third client in the packet-switched network, the third client operable to communicate with the first and second clients;

instructing the first client to produce ring back tone for the mobile station; and transferring a call from the first telephonic device to the second telephonic device.

2. The method of claim 1, wherein the first and second clients are operable to communicate datagrams containing bearer traffic; and wherein placing the first telephonic device on hold reduces the number of datagrams communicated from the second client to the first client.

3. The method of claim 1, wherein the first client is operable to produce ring back tone for the mobile station without receiving datagrams containing the ring back tone from the second and third clients.

4. The method of claim 1, further comprising instructing the second client to produce ring back tone for the first telephonic device after transferring the first telephonic device to the second telephonic device.

5. The method of claim 4, wherein the second client is operable to produce ring back tone for the first telephonic device without receiving datagrams containing the ring back tone from the first and third clients.

6. The method of claim 1, further comprising establishing a second call connection between the mobile station and the second telephonic device before transferring the first telephonic device to the second telephonic device.

7. The method of claim 6, further comprising converting the alerting call connection to the second call connection after a subscriber answers the second telephonic device.

8. The method of claim 6, wherein establishing the second call connection comprises establishing the second call connection using an International Telecommunications Union-Telecommunications (ITU-T) H.323 fast connect.

9. The method of claim 1, wherein the first client comprises a wireless adjunct internet platform.

10. The method of claim 1, wherein the mobile station communicates with the first client using a Global System for Mobile communication (GSM) standard;

the clients communicate using an International Telecommunications Union-Telecommunications (ITU-T) H.323 standard; and the second and third clients each comprises at least one of a gateway operable to communicate with a private branch exchange and a wireless adjunct internet platform operable to communicate with another mobile station.

11. A system for call transferring in a communication system, comprising:
at least one computer processable medium; and
logic encoded on the at least one computer processable medium and operable to:
establish a first call connection between a mobile station and a first telephonic device, the mobile station operable to communicate with a first client in a packet-switched network, the first telephonic device operable to communicate with a second client in the packet-switched network, the first client operable to communicate with the second client;
place the first telephonic device on hold;
establish an alerting call connection between the mobile station and a second telephonic device, the second telephonic device operable to communicate with a third client in the packet-switched network, the third client operable to communicate with the first and second clients;
instruct the first client to produce ring back tone for the mobile station; and
transfer a call from the first telephonic device to the second telephonic device.

12. The system of claim 11, wherein the first and second clients are operable to communicate datagrams containing bearer traffic; and
wherein the number of datagrams communicated from the second client to the first client is reduced when the logic places the first telephonic device on hold.

13. The system of claim 11, wherein the first client is operable to produce ring back tone for the mobile station without receiving datagrams containing the ring back tone from the second and third clients.

14. The system of claim 11, wherein the logic is further operable to instruct the second client to produce ring back tone for the first telephonic device after transferring the first telephonic device to the second telephonic device.

15. The system of claim 14, wherein the second client is operable to produce ring back tone for the first telephonic device without receiving datagrams containing the ring back tone from the first and third clients.

16. The system of claim 11, wherein the logic is further operable to establish a second call connection between the mobile station and the second telephonic device before transferring the first telephonic device to the second telephonic device.

17. The system of claim 16, wherein the logic is further operable to convert the alerting call connection to the second call connection after a subscriber answers the second telephonic device.

18. The system of claim 16, wherein the logic is operable to establish the second call connection using an International Telecommunications Union-Telecommunications (ITU-T) H.323 fast connect.

19. The system of claim 11, wherein the first client comprises a wireless adjunct internet platform.

20. The system of claim 11, wherein the mobile station communicates with the first client using a Global System for Mobile communication (GSM) standard;
the clients communicate using an International Telecommunications Union-Telecommunications (ITU-T) H.323 standard; and
the second and third clients each comprises at least one of a gateway operable to communicate with a private branch exchange and a wireless adjunct internet platform operable to communicate with another mobile station.

21. A system for call transferring in a communication system, comprising:
a first client in a packet-switched network operable to communicate with a mobile station, the first client comprising a ring back tone generator operable to produce a ring back tone;
a second client in the packet-switched network operable to communicate with a first telephonic device and with the first client;
a third client in the packet-switched network operable to communicate with a second telephonic device and with the first and second clients; and
a gatekeeper coupled to the clients and operable to:
establish a first call connection between the mobile station and the first telephonic device;
place the first telephonic device on hold;
establish an alerting call connection between the mobile station and the second telephonic device;
instruct the first client to produce ring back tone for the mobile station; and
transfer a call from the first telephonic device to the second telephonic device.

22. The system of claim 21, wherein the first and second clients are operable to communicate datagrams containing bearer traffic; and
wherein the number of datagrams communicated from the second client to the first client is reduced when the gatekeeper places the first telephonic device on hold.

23. The system of claim 21, wherein the first client is operable to produce ring back tone for the mobile station without receiving datagrams containing the ring back tone from the second and third clients.

24. The system of claim 21, wherein the second client comprises a second ring back tone generator operable to produce a ring back tone; and
wherein the gatekeeper is further operable to instruct the second client to produce ring back tone for the first telephonic device after transferring the first telephonic device to the second telephonic device.

25. The system of claim 24, wherein the second client is operable to produce ring back tone for the first telephonic device without receiving datagrams containing the ring back tone from the first and third clients.

26. The system of claim 21, wherein the gatekeeper is further operable to establish a second call connection between the mobile station and the second telephonic device before transferring the first telephonic device to the second telephonic device.

27. The system of claim 26, wherein the gatekeeper is further operable to convert the alerting call connection to the second call connection after a subscriber answers the second telephonic device.

28. The system of claim 26, wherein the gatekeeper is operable to establish the second call connection using an International Telecommunications Union-Telecommunications (ITU-T) H.323 fast connect.

29. The system of claim 21, wherein the first client comprises a wireless adjunct internet platform.

30. The system of claim 21, wherein the mobile station communicates with the first client using a Global System for Mobile communication (GSM) standard;
the clients communicate using an International Telecommunications Union-Telecommunications (ITU-T) H.323 standard; and
the second and third clients each comprises at least one of a gateway operable to communicate with a private branch exchange and a wireless adjunct internet platform operable to communicate with another mobile station.

31. A method for call transferring in a communication system, comprising:
    establishing a first call connection between a mobile station and a first telephonic device, the mobile station operable to communicate with a first client in a packet-switched network, the first telephonic device operable to communicate with a second client in the packet-switched network, the first client operable to communicate with the second client;
    placing the first telephonic device on hold, wherein the number of datagrams communicated from the second client to the first client is reduced;
    establishing an alerting call connection between the mobile station and a second telephonic device, the second telephonic device operable to communicate with a third client in the packet-switched network, the third client operable to communicate with the first and second clients;
    instructing the first client to produce ring back tone for the mobile station, the first client operable to produce the ring back tone without receiving datagrams containing the ring back tone from the second and third clients;
    transferring a call from the first telephonic device to the second telephonic device; and
    instructing the second client to produce ring back tone for the first telephonic device, the second client operable to produce the ring back tone without receiving datagrams containing the ring back tone from the first and third clients.

32. A method for call transferring in a communication system, comprising:
    establishing a first call connection between a mobile station and a first telephonic device, the mobile station operable to communicate with a first client in the packet-switched network, the first telephonic device operable to communicate with a second client in the packet-switched network, the first client operable to communicate with the second client;
    placing the first telephonic device on hold, wherein the number of datagrams communicated from the second client to the first client is reduced;
    establishing an alerting call connection between the mobile station and a second telephonic device, the second telephonic device operable to communicate with a third client in the packet-switched network, the third client operable to communicate with the first and second clients;
    instructing the first client to produce ring back tone for the mobile station, the first client operable to produce the ring back tone without receiving datagrams containing the ring back tone from the second and third clients;
    establishing a second call connection between the mobile station and the second telephonic device using an International Telecommunications Union-Telecommunications (ITU-T) H.323 fast connect after a subscriber answers the second telephonic device; and
    transferring a call from the first telephonic device to the second telephonic device.

33. A system for call transferring in a communication system, comprising:
    at least one computer processable medium; and
    logic encoded on the at least one computer processable medium and operable to:
        establish a first call connection between a mobile station and a first telephonic device, the mobile station operable to communicate with a first client in a packet-switched network, the first telephonic device operable to communicate with a second client in the packet-switched network, the first client operable to communicate with the second client;
        place the first telephonic device on hold, wherein the number of datagrams communicated from the second client to the first client is reduced;
        establish an alerting call connection between the mobile station and a second telephonic device, the second telephonic device operable to communicate with a third client in the packet-switched network, the third client operable to communicate with the first and second clients;
        instruct the first client to produce ring back tone for the mobile station, the first client operable to produce the ring back tone without receiving datagrams containing the ring back tone from the second and third clients;
        transfer a call from the first telephonic device to the second telephonic device; and
        instruct the second client to produce ring back tone for the first telephonic device, the second client operable to produce the ring back tone without receiving datagrams containing the ring back tone from the first and third clients.

34. A system for call transferring in a communication system, comprising:
    at least one computer processable medium; and
    logic encoded on the at least one computer processable medium and operable to:
        establish a first call connection between a mobile station and a first telephonic device, the mobile station operable to communicate with a first client in a packet-switched network, the first telephonic device operable to communicate with a second client in the packet-switched network, the first client operable to communicate with the second client;
        place the first telephonic device on hold, wherein the number of datagrams communicated from the second client to the first client is reduced;
        establish an alerting call connection between the mobile station and a second telephonic device, the second telephonic device operable to communicate with a third client in the packet-switched network, the third client operable to communicate with the first and second clients;
        instruct the first client to produce ring back tone for the mobile station, the first client operable to produce the ring back tone without receiving datagrams containing the ring back tone from the second and third clients;
        establish a second call connection between the mobile station and the second telephonic device using an International Telecommunications Union-Telecommunications (ITU-T) H.323 fast connect after a subscriber answers the second telephonic device; and
        transfer a call from the first telephonic device to the second telephonic device.

35. A system for call transferring in a communication system, comprising:
    a first client in a packet-switched network operable to communicate with a mobile station, the first client comprising a first ring back tone generator operable to produce a ring back tone;

a second client in the packet-switched network operable to communicate with a first telephonic device and with the first client, the second client comprising a second ring back tone generator operable to produce a ring back tone;

a third client in the packet-switched network operable to communicate with a second telephonic device and with the first and second clients; and a gatekeeper coupled to the clients and operable to:
  establish a first call connection between the mobile station and the first telephonic device;
  place the first telephonic device on hold, wherein the number of datagrams communicated from the second client to the first client is reduced;
  establish an alerting call connection between the mobile station and the second telephonic device;
  instruct the first client to produce ring back tone for the mobile station, the first client operable to produce the ring back tone without receiving datagrams containing the ring back tone from the second and third clients;
  transfer a call from the first telephonic device to the second telephonic device; and
  instruct the second client to produce ring back tone for the first telephonic device, the second client operable to produce the ring back tone without receiving datagrams containing the ring back tone from the first and third clients.

36. A system for call transferring in a communication system, comprising:

a first client in a packet-switched network operable to communicate with a mobile station, the first client comprising a first ring back tone generator operable to produce a ring back tone;

a second client in the packet-switched network operable to communicate with a first telephonic device and with the first client, the second client comprising a second ring back tone generator operable to produce a ring back tone;

a third client in the packet-switched network operable to communicate with a second telephonic device and with the first and second clients; and a gatekeeper coupled to the clients and operable to:
  establish a first call connection between the mobile station and the first telephonic device;
  place the first telephonic device on hold, wherein the number of datagrams communicated from the second client to the first client is reduced;
  establish an alerting call connection between the mobile station and the second telephonic device;
  instruct the first client to produce ring back tone for the mobile station, the first client operable to produce the ring back tone without receiving datagrams containing the ring back tone from the second and third clients;
  establish a second call connection between the mobile station and the second telephonic device using an International Telecommunications Union-Telecommunications (ITU-T) H.323 fast connect after a subscriber answers the second telephonic device; and
  transfer a call from the first telephonic device to the second telephonic device.

* * * * *